No. 741,944. PATENTED OCT. 20, 1903.
O. B. TAYLOR.
HARDWOOD FLOOR SCRAPER.
APPLICATION FILED JUNE 12, 1902.
NO MODEL.
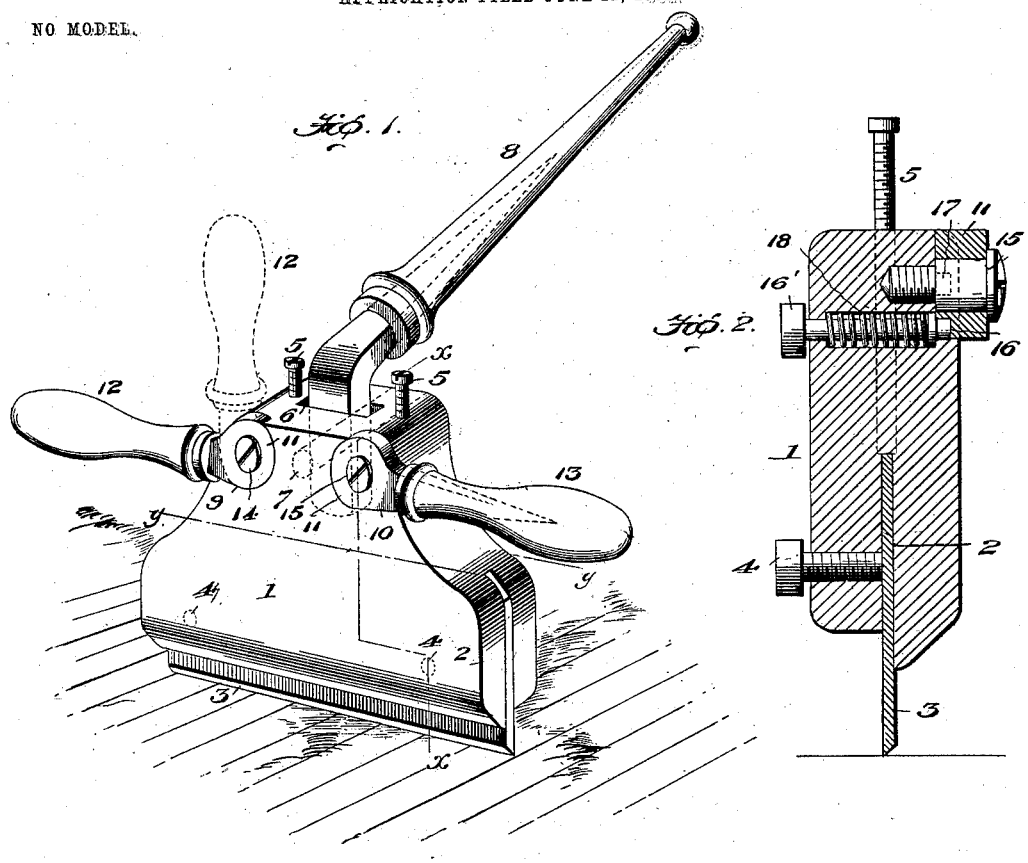
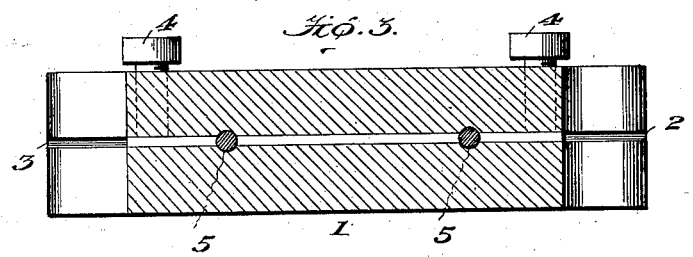
Witnesses. Inventor.
Oliver B. Taylor
by Henry N. Copp
his Atty.

No. 741,944. Patented October 20, 1903.

UNITED STATES PATENT OFFICE.

OLIVER B. TAYLOR, OF MUSKEGON, MICHIGAN.

HARDWOOD-FLOOR SCRAPER.

SPECIFICATION forming part of Letters Patent No. 741,944, dated October 20, 1903.

Application filed June 12, 1902. Serial No. 111,391. (No model.)

*To all whom it may concern:*

Be it known that I, OLIVER B. TAYLOR, a citizen of the United States, residing at Muskegon, county of Muskegon, and State of Michigan, have invented certain new and useful Improvements in Hardwood-Floor Scrapers, of which the following is a specification.

My invention relates to hardwood-floor scrapers.

The object of the invention is the provision of an improved scraper for hardwood floors or other hardwood surfaces which will be of simple and durable construction, adapted for easy and efficient manipulation to accomplish the scraping of the floor, including corners and close to the base-board, and which may be operated by two men in a very rapid manner.

The invention is set forth in detail hereinafter and the novel features recited in the appended claims.

In the accompanying drawings, Figure 1 is a perspective view of the complete invention, one handle being shown raised in dotted lines; Fig. 2, a section on line $x\ x$ of Fig. 1, showing the means for locking the handles; Fig. 3, a section on line $y\ y$ of Fig. 1, and Fig. 4 a detail of the handle end.

The head 1 is of solid metal to give weight and is slit at 2 to receive the scraper 3, which is clamped therein by the screws 4, while 5 represents adjusting thumb-screws adapted to bear on the upper edge of the scraper 3 to follow it as it is lowered during adjustment. In the top of the head is a laterally-flared recess 6, in which is pivoted on a screw 7 a pull-handle 8, of sufficient length for manipulation by a man standing, said handle extending upwardly and rearwardly and adapted for lateral movement on its pivot-screw 7 in relation to the head, so that should the operator who is standing and manipulating the handle sway toward the side it will not affect the scraping operation. The head is recessed at 9 and 10 for the reception of the heads 11 of the holding-down handles 12 and 13 and they are pivoted to the head by the screws 14 and 15. These heads each have two holes 16 and 17 to receive the tip or end of the locking-bolts 16', (one being used for each holding-down handle,) movable transversely in the head and pressed by the coil-springs 18 surrounding them. The holes 16 and 17 are so disposed that when the handles are positioned laterally or horizontally the locking-bolts enter holes 16 and lock the handles in that position, and when raised vertically the bolts enter the holes 17 and lock the handles in the latter position. The handles are ordinarily in horizontal position and a man on the floor presses down and pushes on them while being pulled by the man standing; but when scraping adjacent the base-board or in a corner the handles are raised and locked, as indicated by dotted lines, and pressure can be applied thereto in that position by the man on the floor.

Having thus described my invention, what I claim as new, and desire to secure by Letters Patent, is—

1. In a device of the class described, the combination with a scraper-head having a vertically-extending laterally-flared slot or recess, of a pull-handle received and pivoted in the recess on a horizontal pivot and adapted to swing laterally to the head.

2. In a device of the class described, the combination with a scraper-head, of a pull-handle connected to the head, and a holding-down and pusher handle, both pivotally connected to the head.

3. In a device of the class described, the combination with a scraper-head, of a pull-handle connected to the head, and holding-down and pusher handles pivoted to the head and arranged to extend laterally or upwardly.

4. In a device of the class described, the combination with a scraper-head, of a pull-handle connected to the head, and holding-down and pusher handles pivoted to the head, and means for locking the holding-down handles in lateral or upright position.

5. In a device of the class described, the combination with a scraper-head, of a handle pivoted to the head and arranged to extend laterally or upwardly, and means for locking the handle in lateral or upright position.

6. In a device of the class described, the combination with a scraper-head, of a handle pivoted to the head and arranged to extend laterally or upwardly, said handle having holes at different points, and a spring-actuated bolt adapted to snap into either hole and lock the handle in lateral or upright position.

7. A floor-scraper comprising a head having an attached handle, and a blade-seat, a scraping-blade, a clamp-plate and holding-bolts to clamp the blade in adjusted position on the seat, and hand-grips laterally extended from opposite sides of the head.

8. In a device of the class described, the combination with a scraper-head, of a pull-handle connected to the head, and holding-down and pusher handles so connected to the head as to be adjustable to a lateral or a vertical position.

9. In a device of the class described, the combination with a scraper-head, of a pull-handle connected to the head, and a holding-down and pusher handle adjustably connected to the head so as to be adapted to extend laterally or upwardly.

10. In a device of the class described, the combination with a scraper-head, of a pull-handle connected to the head, a holding-down and pusher handle adjustably connected to the head so as to be adapted to extend laterally or upwardly, and means for locking the holding-down and pushing handle in lateral or in upright position.

11. In a device of the class described, the combination with a scraper-head, of a pull-handle connected to the head, holding-down and pusher handles so connected to the head as to be adjustable to a lateral or a vertical position, and means for locking each holding-down and pusher handle in lateral or in upright position independently of the position of the other handle.

In testimony whereof I hereunto affix my signature in presence of two witnesses.

OLIVER B. TAYLOR.

Witnesses:
   DANIEL D. EAGAN,
   H. T. DE WITT.